United States Patent [19]

Tackles

[11] Patent Number: 4,870,873
[45] Date of Patent: Oct. 3, 1989

[54] BICYCLE TOE CLIP

[75] Inventor: George J. Tackles, San Jose, Calif.

[73] Assignee: Specialized Bicycle Components, Inc., Morgan Hill, Calif.

[21] Appl. No.: 224,377

[22] Filed: Jul. 26, 1988

[51] Int. Cl.$^4$ .............................................. G05G 1/14
[52] U.S. Cl. .................................................. 74/594.6
[58] Field of Search ............... 74/594.6, 594.5, 594.1, 74/594.4; 36/131; D12/125

[56] References Cited

U.S. PATENT DOCUMENTS

| D. 275,846 | 10/1984 | Buchanan, Jr. et al. | D12/125 |
| 4,033,199 | 7/1977 | Bonder | 74/594.6 |
| 4,171,824 | 10/1979 | Foster | 280/294 |
| 4,172,392 | 10/1979 | Foster | 74/594.6 |
| 4,244,239 | 1/1981 | Campagnolo | 74/594.6 X |
| 4,442,732 | 4/1984 | Okajima | 74/594.6 X |
| 4,596,163 | 6/1986 | Bon | 74/594.6 |
| 4,620,375 | 11/1986 | Wallace | 36/125 X |
| 4,682,514 | 7/1987 | Jona | 74/594.6 |

FOREIGN PATENT DOCUMENTS 2500658 8/1982 France ............................ 74/594.6

Primary Examiner—Rodney M. Lindsey
Attorney, Agent, or Firm—Schlemmer Dalton Associates

[57] ABSTRACT

A bicycle toe clip is disclosed having double strap carriers corresponding to the upper of a bike shoe for holding an associated shoe strap in a generally rectangular wide-mouth configuration to permit quick foot entry and exit.

3 Claims, 1 Drawing Sheet

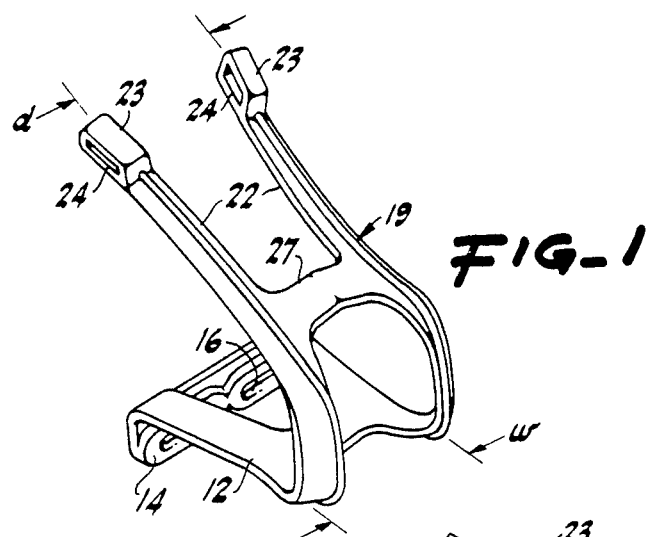
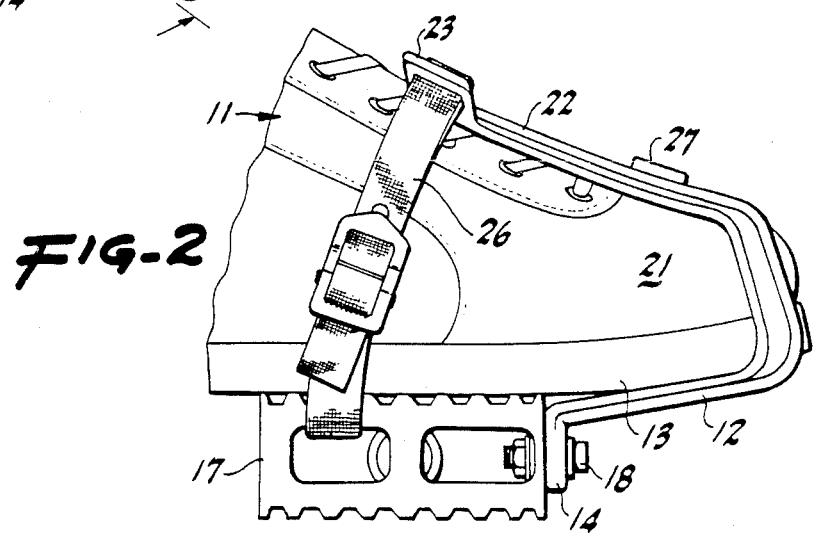
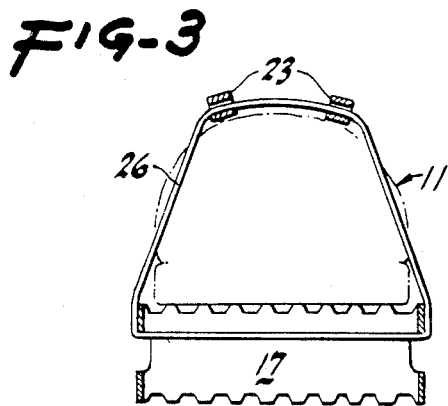
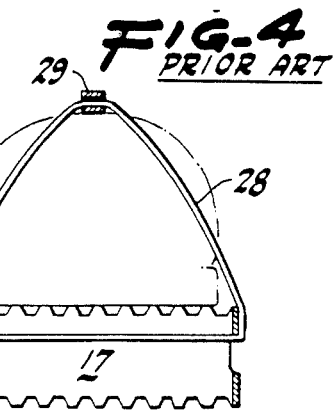

4,870,873

BICYCLE TOE CLIP

BACKGROUND OF THE INVENTION

This present invention relates to bicycle toe clips which prevent a bicyclist's foot from slipping off the pedal during periods of strenuous activity.

Conventional toe clips secure the user's foot to a bicycle pedal using a strap which is cinched through the pedal and the strap carrier section of the toe clip on top of the foot. Unfortunately, when the strap is cinched tight enough to secure the shoe, it effectively locks the shoe in the clip, making quick exit and entry difficult, if not impossible.

SUMMARY OF THE INVENTION

It is an object of the present invention to provide a bicycle toe clip which provides the desired shoe retention function yet permits quick entry and exit.

It is another object to provide a toe clip which decreases pressure on the top of the foot.

A toe clip according to our present invention which satisfies the above and other objects comprises: a base having shape and dimension, including the width thereof, conformed to a shoe of selected size and shape; a lip or flange formed integrally with the base for mounting the toe clip to a bicycle pedal; and strap carrier means formed integrally with the base and conformed to the shape and dimension of the upper of the shoe, including the longitudinal profile of the shoe. The strap carrier means includes first and second longitudinally-extending strap carriers connected at one end to the base, laterally spaced apart a distance less than the width of the base and having holes formed in the upper ends thereof for receiving a strap. As a result of this construction, a strap cinched through the pedal and carrier ends forms a rectangular wide-mouth shape in the transverse plane of the shoe which facilitates entry and exit thereof. Preferably, the toe clip is plastic and incorporates relatively short strap carriers which terminate between the toe and the arch to eliminate pressure on top of the foot above the arch.

BRIEF DESCRIPTION OF THE DRAWINGS

The above and other aspects of the present invention are described with respect to the enclosed drawings in which:

FIG. 1 is a perspective view of a bicycle toe clip made in accordance with our present invention;

FIG. 2 is a side elevational view showing the toe clip mounted to a bicycle pedal and securing a bicyclist's foot and shoe;

FIG. 3 schematically depicts the rectangular configuration of a strap attached to the toe clip shown in FIG. 1; and FIG. 4 depicts a prior art toe clip and strap configuration.

DETAILED DESCRIPTION OF THE PREFERRED EMBODIMENT(S)

FIGS. 1-3 depict various aspects of a bicycle toe clip 10, made according to our present invention, which securely retains a user's foot and shoe FIG. 2, yet provides easy exit and entry. Also, in eliminating strap pressure on the top of the foot above the arch, our toe clip is comfortable during use.

Initially, and referring primarily to FIG. 1, our toe clip 10 preferably has a U-shaped longitudinal configuration and comprises a base 12 of suitable shape and size, including width, w, for supporting the front sole section 13, FIG. 2, of a shoe 11 of a selected size or a selected range of sizes. (The toe clip can be formed in a single size or several sizes which accommodate a wide range of standard shoe sizes and shapes.) A downwardly-extending lip or flange 14 is formed integrally with the base 12 at the rear thereof and contains one or more holes 16 which permit mounting the toe clip 10 to the pedal 17 of a bicycle using fastening means such as the illustrated screw 18 or rivets, etc.

An upper strap carrier section 19 is formed integrally with the front of the base 12 and is conformed to the shape and dimension of the front section 21 of the upper of the selected shoe(s) 11. In particular, the strap carrier section 19 is conformed to the longitudinal profile of the shoe's front upper section 21. The strap carrier section comprises a pair of longitudinally-extending, laterally-spaced strap carriers 22—22 which are bent at the lower front end thereof to conform to the shape of the toe of the shoe 11 and are spaced apart a distance, d, at the upper end thereof which preferably is less than the width of the base 12 and pedal 17. The enlarged, free upper ends 23 each have a hole 24 formed therein for receiving strap 26. Cross member 27 supports the two strap carriers 22—22 and maintains the desired spacing therebetween.

The toe clip 10 is formed of polyamide plastic material; more generally plastic or elastomeric materials can be used.

Referring primarily to FIGS. 2 and 3, when cinched through the spaced carriers 22—22 and the pedal 17, strap 26 is maintained in a generally rectangular configuration when a shoe is not positioned on the pedal. Preferably, a between-carrier spacing, d, is used which is less than the width of the pedal 17, so that the strap defines a trapezoidal configuration of the type shown in FIG. 3. In this cinched configuration, the strap 26 securely retains the shoe 11 (the outline of which is shown in phantom in FIG. 3) against accidental release in the lateral and forward directions. Also, and in contrast to the relatively difficult shoe entry and exit associated with the triangular strap configuration 28 provided by the single strap carrier 29 used in the conventional prior art toe clip shown in FIG. 4, the rectangular trapezoidal shape provides a relatively wide mouth in the transverse plane of the shoe 11 which more closely conforms to the cross-section of the shoe and affords relative ease of entry and exit. The ease of entry and exit is very important, in general, for convenience and, in particular, for safety and as a time-saving feature when it is desirable or necessary to be able to mount or remount quickly. Please note, three or more strap carriers could be used to provide the desired widemouth strap configuration.

In addition, our strap carriers 22—22 preferably are relatively short, i.e., the ends 23—23 are positioned proximate the rear of the toes and proximate the front of the arch of the foot so that the strap is positioned forward of or at the forward portion of the arch, thereby relieving uncomfortable pressure on the upper portion of the foot.

Having thus described preferred and alternative embodiments of the present invention, it will be understood that those of usual skill in the art will readily develop modifications and extensions of the present invention which are within the scope thereof as defined by the following claims.

What is claimed:

1. A bicycle toe clip having a wide mouth for facilitating entry and exit of a bike shoe, comprising:
   a base having shape and dimension, including the width thereof, conformed to a shoe of selected size range and shaped;
   a flange formed integrally with said base for mounting the toe clip to a bicycle pedal;
   strap carrier means formed integrally with said base and conformed to the shape and dimension of the upper of said shoe, including the longitudinal profile of said shoe, said strap carrier means having a generally H-shaped configuration defined by first and second substantially parallel longitudinally-extending strap carriers connected at one end thereof to said base and laterally spaced apart and supported by a transverse cross-member connected to said strap carriers intermediate the length thereof and having holes formed in opposite free ends thereof for receiving a strap;
   whereby a strap cinched through said pedal and strap holes forms a rectangular wide-mouth shape in the transverse plane of said shoe and said spaced-apart strap carriers and said base together define a rectangular wide mouth shape in the transverse plane of said shoe substantially along the length of said strap carriers, for facilitating entry and exit thereof.

2. The bicycle toe clip of claim 1, wherein the toe clip is plastic.

3. The bicycle toe clip of claim 1, wherein the base, flange and carrier strap means comprise an integral structure formed of plastic.

* * * * *

UNITED STATES PATENT AND TRADEMARK OFFICE
CERTIFICATE OF CORRECTION

PATENT NO. : 4,870,873

DATED : October 3, 1989

INVENTOR(S) : GEORGE J. TACKLES

It is certified that error appears in the above-identified patent and that said Letters Patent is hereby corrected as shown below:

In Col. 1, line 63, after "and shoe", insert --11--.

Signed and Sealed this

Twenty-eighth Day of January, 1992

Attest:

HARRY F. MANBECK, JR.

*Attesting Officer*   *Commissioner of Patents and Trademarks*

REEXAMINATION CERTIFICATE (1671st)

United States Patent [19]

Tackles

[11] B1 4,870,873

[45] Certificate Issued Mar. 31, 1992

[54] BICYCLE TOE CLIP

[75] Inventor: George J. Tackles, San Jose, Calif.

[73] Assignee: Specialized Bicycle Components, Inc., Morgan Hill, Calif.

Reexamination Request:
No. 90/002,304, Mar. 21, 1991

Reexamination Certificate for:
Patent No.: 4,870,873
Issued: Oct. 3, 1989
Appl. No.: 224,377
Filed: Jul. 26, 1988

Certificate of Correction issued Aug. 27, 1990.

[51] Int. Cl.$^5$ .............................................. G05G 1/14
[52] U.S. Cl. ................................................... 74/594.6
[58] Field of Search ........................... 74/594.6, 594.5

[56] References Cited
U.S. PATENT DOCUMENTS
D. 275,846 10/1984 Buchanan, Jr. et al. .......... D12/125

FOREIGN PATENT DOCUMENTS
1011821 6/1952 France .
2500658 8/1982 France ................................ 74/594.6
4399 of 1882 United Kingdom ............... 74/594.6
458949 12/1936 United Kingdom .

OTHER PUBLICATIONS 1934-35 Mestre et Blatge Catalogue, Sargent Toe Clip, Reference Number 4800.
International Registered Design DM/006093, to Italcicli Cycle System ISC AG, 11/1985.
*American Bicyclist & Motorcyclist*, 2/88, p. 53.

*Primary Examiner*—Rodney M. Lindsey

[57] ABSTRACT

A bicycle toe clip is disclosed having double strap carriers corresponding to the upper of a bike shoe for holding an associated shoe strap in a generally rectangular wide-mouth configuration to permit quick foot entry and exit.

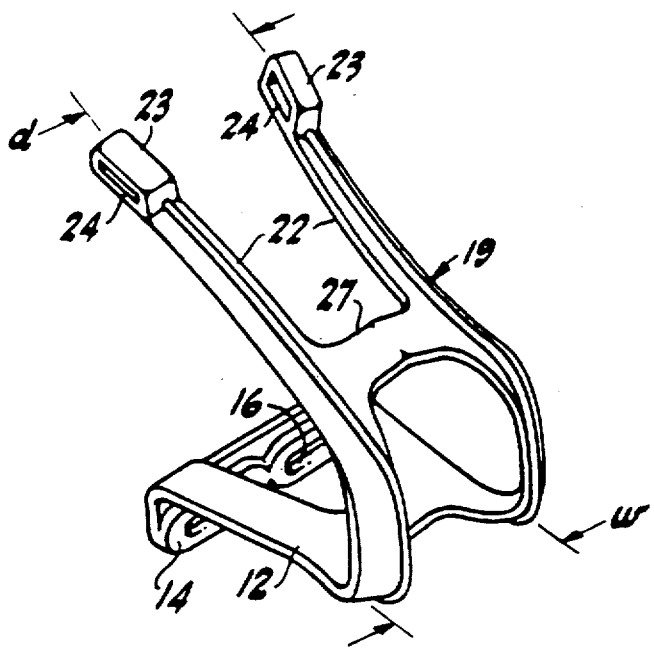

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2 and 3 are cancelled.

* * * * *